Feb. 26, 1957
R. STEINER
2,782,817
EDGE TRIMMING ATTACHMENT AND FENCE
ADJUSTING MEANS FOR PLANER TABLES
Filed July 26, 1955
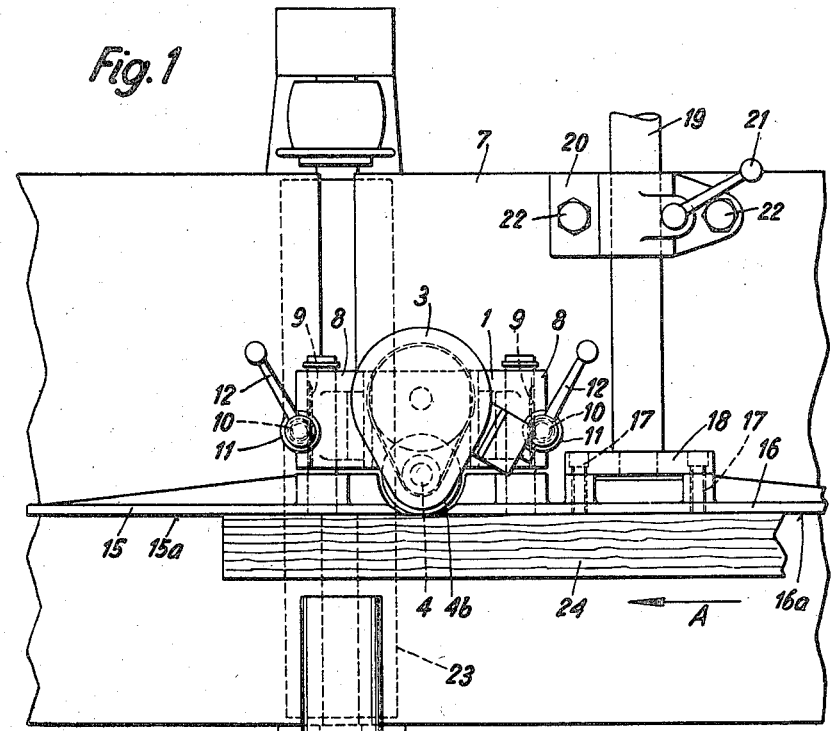
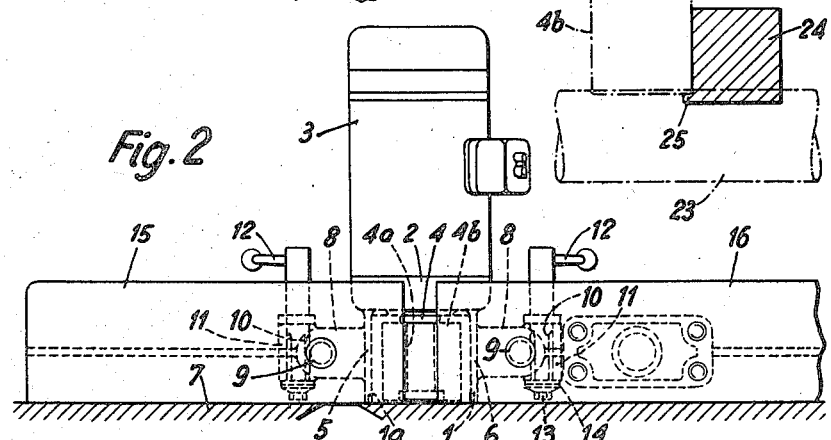
INVENTOR.
RUDOLF STEINER
BY
ATTORNEY.

2,782,817

EDGE TRIMMING ATTACHMENT AND FENCE ADJUSTING MEANS FOR PLANER TABLES

Rudolf Steiner, Iffwil, Switzerland, assignor to Mawera Maschinen-Werkzeuge-Apparate-G. m. b. H., Langenthal, Switzerland, a Swiss firm Application July 26, 1955, Serial No. 524,490

Claims priority, application Switzerland July 26, 1954

6 Claims. (Cl. 144—117)

Smoothing planers generally are not equipped to permit trimming of a side surface of planks and the like.

The primary object of the present invention is to provide a simple and robust apparatus as an accessory adapted to be mounted on any existing smoothing planer, whereby two surfaces of a plank may be machined in a single operation.

Other objects and features will appear from the accompanying description of an embodiment of the invention with reference to the accompanying drawings in which:

Fig. 1 is a plan view showing the trimming apparatus mounted on a smoothing planer, Fig. 2 is an elevational view of the apparatus shown in Fig. 1, and Fig. 3 is a diagrammatical view showing a cross-section of a work piece and how two longitudinal surfaces thereof are machined by the cutter shafts of the smoothing planer and of the trimming apparatus.

The trimming apparatus represented on the drawings comprises a support member 1 the upper portion of which is formed by a casing 2 to the top surface of which is secured the casing of an electric motor 3. The shaft of the latter is drivingly connected to a cutter shaft 4 by means of a belt transmission arranged in casing 2. Both these shafts are perpendicular to the bottom surface of the support 1. The cutter shaft 4 is rotatably mounted in casing 2 and its lower portion 4a is overhanging. A tool carrier 4b removably secured to this portion rotates within a cage having lateral walls 5 and 6 formed as parts of the support 1. The bottom surfaces 1a of these walls rest on the guiding surface of a horizontal work piece carrying and guiding table 7 of a smoothing planer. A clearance of about one millimeter to 2 millimeters is provided between the bottom surface of the tool carrier 4b and the table 7.

The walls 5 and 6 are formed at their outwardly turned side with brackets 8 having parallel horizontal bores in each of which a rack 9 is guided for longitudinal movement in a direction which stands at right angle to the axis of rotation of the cutter shaft 4. Each bracket also has a portion 11 provided with a vertical bore in which an actuating shaft 10 is rotatably mounted. This shaft has a handle 12 at its upper end and is formed over part of its length as a pinion meshing with the adjacent rack 9. The axial fixation of each shaft is obtained by a flange on the same and by an axially extending screw bolt 13 acting by means of a spring washer 14 which produces sufficient friction so that the shaft will not rotate if it is not actuated by means of its handle 12. Two guides 15, 16 are provided which are rigidly secured to the front end of either of the racks 9 and which have vertical guiding surfaces 15a and 16a, respectively, which are parallel to each other and to the axis of the cutter shaft 4. The guides approach closely the tool carrier 4b of the cutter shaft 4 so that said carrier protrudes only by a small amount beyond either one of the surfaces 15a, 16a. This amount may be adjusted independently for each of these surfaces by actuating the corresponding handle 12.

The guide 16 has on its rear side ribs in corner portions of which are provided threaded holes. A plate 18 is fixed to this guide 16 by means of screws 17 engaging these holes and is secured to the fore end of a rod 19 extending parallelly to the racks 9 through a bore of a clamping bracket 20 fixed to the table 7 of the smoothing planer by means of screw bolts 22. The clamping bracket 20 includes a locking member 21 serving to lock said rod 19 when the guide 16 has been adjusted to the position desired.

The bracket 20 is the sole fixture of the whole trimming apparatus attached to the smoothing planer, the table of which has to this end been provided with two threaded holes receiving the bolts 22. Only the member 21 must be actuated to permit the assembly formed by the two guides 15, 16, the support 1 and the parts carried thereby to be shifted in the direction of the width of the table 7.

As shown in Fig. 1, the cutter shaft 23 of the smoothing planer is located behind the cutter shaft of the trimming apparatus if viewed in the direction of the arrow A in which work pieces are advanced on being machined. It follows therefrom that a particular portion of the work piece 24, see Fig. 3, is first machined by the cutter head 4b of the trimming apparatus and only afterwards by the cutter shaft of the smoothing planer. Owing to the clearance between the cutter head and the top surface of the smoothing planer, a corner portion 25 will first be left on the work piece 24. This corner portion, however, will be machined away together with the bottom layer in the same operation by the cutter shaft 23 of the smoothing planer; thus, a neat edge will be formed on the work piece.

The apparatus of the invention has proved to be a simple and robust accessory for a smoothing planer to enable the same to machine planks and the like in one operation on two longitudinal surfaces perpendicular to each other.

I claim:

1. An attachment for a planer table, said attachment comprising a support member resting on the planer table, a cutter shaft rotatably mounted on said support members perpendicular to the planer table, driving means for said cutter shaft mounted on said support means, two work guides resting on the work table and having plane guide surfaces for guiding the work, means for individually adjustably connecting said work guides with said support member for individually moving said guide surfaces relatively to said support member in a direction perpendicular to the axis of rotation of said cutter shaft, and means separate from said support member connected with and adjustably securing one of said guides to the planer table.

2. A device as defined in claim 1 in which said securing means include a clamping bracket adapted to be mounted on the planer table, said bracket having a bore, a rod rigidly connected with one of said guides and longitudinally slidably extending through said bore, and means for tightening said clamping bracket on said rod.

3. An attachment for a planer table, said attachment comprising a support member resting on the planer table, a cutter shaft rotatably mounted on said support member perpendicularly to the planer table, driving means for said cutter shaft mounted on said support means, two work guides resting on the work table and having plane guide surfaces for guiding the work, means separate from said support member connected with and adjustably securing one of said guides to the planer table, each of said guides having a guiding surface for the work piece, a rack rigidly secured to each of said guides and extending at a right angle to said guiding surfaces, said support member having two parallel horizontal bores in which said racks are individually received to move in an axial direction in the bores, said support member having two vertical bores individually adjacent to said horizontal bores, a shaft rotatably received in each of said vertical bores, said last mentioned shafts being individually provided with pinions coaxially of the shafts, the teeth of said pinions being in mesh with the teeth of said racks, and a handle on each of said last mentioned shafts.

4. In a planer having a table and a cutter shaft secured to and being positioned parallel to and below the table, an attachment comprising a support member resting on the planer table, a cutter shaft rotatably mounted on said support member perpendicularly to the planer table, driving means for said cutter shaft mounted on said support means, two work guides resting on the work table and having plane guide surfaces for guiding the work, means for individually adjustably connecting said work guides with said support member for individually moving said guide surfaces relatively to said support member in a direction perpendicular to the axis of rotation of said cutter shaft, and means separate from said support member connected with and adjustably securing one of said guides to the planer table, said attachment being positioned on the planer table on the side of the cutter shaft which is parallel to and below the planer table on which side the work piece arrives, the work piece being first worked by said cutter which forms part of the attachment and subsequently by the cutter of the planer.

5. A device as defined in claim 1, in which said driving means include an electric motor mounted on said support member.

6. A device as defined in claim 1, in which said securing means are rigidly connected with the respective guide.

References Cited in the file of this patent

UNITED STATES PATENTS

| | | |
|---|---|---|
| 328,794 | Lhote | Oct. 20, 1885 |
| 1,593,316 | Tetard | July 20, 1926 |
| 1,947,885 | Lantz | Feb. 20, 1934 |
| 2,076,511 | Hedgpeth | Apr. 6, 1937 |
| 2,624,382 | Moore | Jan. 6, 1953 |

FOREIGN PATENTS

| | | |
|---|---|---|
| 374,207 | Great Britain | June 9, 1932 |